United States Patent
Wang et al.

(10) Patent No.: US 12,030,969 B2
(45) Date of Patent: Jul. 9, 2024

(54) PLASTIC WASTE-DERIVED POLYMERS AND RESINS AND METHODS OF MAKING THE SAME

(71) Applicant: Alliance for Sustainable Energy, LLC, Golden, CO (US)

(72) Inventors: Chen Wang, Superior, CO (US); Gregg Tyler Beckham, Golden, CO (US); Nicholas A. Rorrer, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 432 days.

(21) Appl. No.: 17/371,421

(22) Filed: Jul. 9, 2021

(65) Prior Publication Data
US 2022/0017670 A1 Jan. 20, 2022

Related U.S. Application Data

(60) Provisional application No. 63/050,912, filed on Jul. 13, 2020.

(51) Int. Cl.
*C08F 236/14* (2006.01)
*C08F 216/36* (2006.01)
*C08J 11/14* (2006.01)

(52) U.S. Cl.
CPC .......... *C08F 216/36* (2013.01); *C08F 236/14* (2013.01); *C08J 11/14* (2013.01); *C08J 2367/04* (2013.01)

(58) Field of Classification Search
USPC ........................................................ 521/48
See application file for complete search history.

(56) References Cited

U.S. PATENT DOCUMENTS

| | | |
|---|---|---|
| 4,068,082 A | 1/1978 | Stoffey et al. |
| 10,280,255 B2 | 5/2019 | Beckham et al. |

FOREIGN PATENT DOCUMENTS

| | | | |
|---|---|---|---|
| CN | 1091782 A | * 9/1994 | ............... C11D 7/24 |
| CN | 1234050 A | * 11/1999 | ............... C08L 67/07 |

OTHER PUBLICATIONS

CN-1091782-A Machine Translation (Year: 1994).*
CN-1234050-A Machine Translation (Year: 1999).*
Atta et al., "Curable resins based on recycled poly(ethylene terephthalate) for coating applications", Progress in Organic Coatings, Jan. 2006, vol. 55, No. 1, pp. 50-59.
Karayannidis et al., "Chemical Recycling of PET by Glycolysis: Polymerization and Characterization of the Dimethacrylated Glycolysate", Macromolecular Materials and Engineering, Nov. 2006, vol. 291, No. 11, pp. 1338-1347.
Torpanyacharn et al., "Curable precursors derived from chemical recycling of poly(ethylene terephthalate) and polylactic acid and physical properties of their thermosetting (co)polyesters", Polymer Bulletin, 2018, vol. 75, pp. 395-414.

* cited by examiner

*Primary Examiner* — Terressa Boykin
(74) *Attorney, Agent, or Firm* — Michael A. McIntyre

(57) ABSTRACT

The present disclosure relates to a resin that includes a first repeat unit as defined by Structure (I)

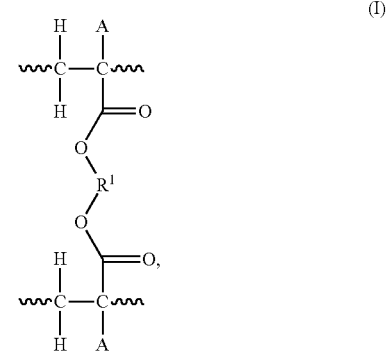

where A is either a methyl group or a hydrogen atom, $R^1$ is a first bridging group, and ⌇ is a covalent bond.

18 Claims, 9 Drawing Sheets

PLASTIC WASTE-DERIVED POLYMERS AND RESINS AND METHODS OF MAKING THE SAME

CROSS-REFERENCE TO RELATED APPLICATIONS

This application claims priority from U.S. Provisional Patent Application No. 63/050,912 filed on Jul. 13, 2020, the contents of which are incorporated herein by reference in its entirety.

CONTRACTUAL ORIGIN

This invention was made with government support under Contract No. DE-AC36-08GO28308 awarded by the Department of Energy. The government has certain rights in the invention.

BACKGROUND

Plastic waste has escalated to an environmental crisis. Abandoned plastics in the ocean are expected to exceed fish (by weight) before 2050. Despite the increasing regulatory effort, plastics recycling rates remain low. Thus, technological developments that provide a more circular economy of plastics and/or provide alternative, bioderived raw materials for plastics manufacturing are urgently needed.

SUMMARY

An aspect of the present disclosure is a resin that includes a first repeat unit having a structure as defined by

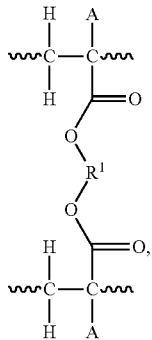

where A is a methyl group or a hydrogen atom, $R^1$ is a first bridging group, and 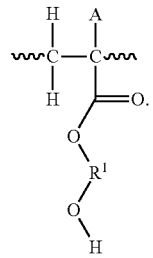 is a covalent bond.

In some embodiments of the present disclosure, $R^1$ may include at least one of

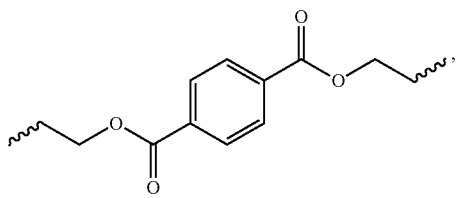

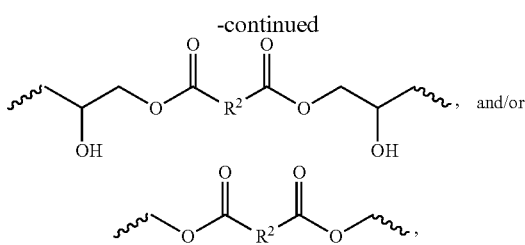

where $R^2$ is a second bridging group.

In some embodiments of the present disclosure, $R^2$ may include at least one of

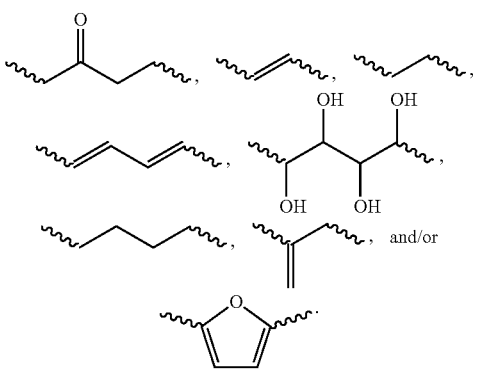

In some embodiments of the present disclosure, $R^1$ is

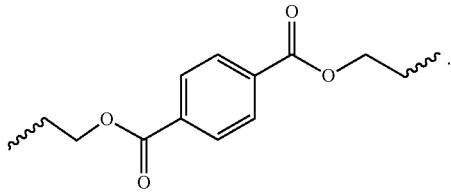

In some embodiments of the present disclosure, the resin may further include a second repeat unit having a structure as defined by

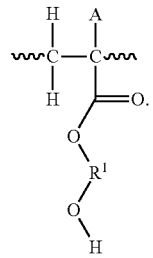

In some embodiments of the present disclosure, the resin may have a tensile strength between about 20 MPa and about 100 MPa. In some embodiments of the present disclosure, the resin may have a modulus between about 0.5 GPa and about 3.0 GPa. In some embodiments of the present disclosure, the resin may have an elongation at break between about 0.1% and about 100%. In some embodiments of the present disclosure, the resin may have a glass transition temperature between about 0° C. and about 250° C.

An aspect of the present disclosure is a method that includes reacting a first functionalized intermediate with a second functionalized intermediate to form a resin, where the first functionalized intermediate includes

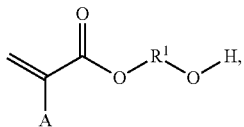

the second functionalized intermediate includes

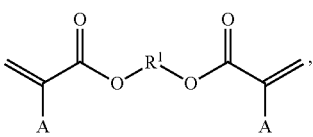

the resin includes a first repeat unit as defined by

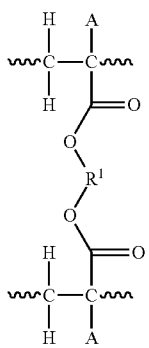

and a second repeat unit as defined by

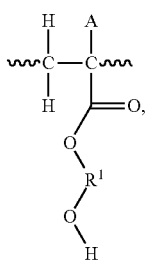

where A is either a methyl group or a hydrogen atom, $R^1$ is a first bridging group, and ⌇ is a covalent bond.

In some embodiments of the present disclosure, the method may further include, prior to the reacting, in a first mixture that includes a deconstruction product and a functionalized reactant, functionalizing the deconstruction product, where the deconstruction product includes

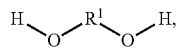

and the functionalizing produces the first functionalized intermediate and the second functionalized intermediate.

In some embodiments of the present disclosure, the reacting may be performed using a second mixture of the first functionalized intermediate and the second functionalized intermediate, and the first functionalized intermediate and the second functionalized intermediate may be at a molar ratio between about 1:2 and about 1:1. In some embodiments of the present disclosure, the second mixture may have a viscosity between about 800 cP and 1200 cP when measured at a temperature of about 25° C. In some embodiments of the present disclosure, the reacting may be performed at a temperature between 20° C. and 150° C.

In some embodiments of the present disclosure, the reacting may be photoinitiated at a wavelength between 254 nm and 500 nm. In some embodiments of the present disclosure, the reacting may be photoinitiated using at least one of diphenyl(2,4,6-trimethylbenzoyl)phosphine oxide (TPO), ethyl (2,4,6-trimethylbenzoyl) phenylphosphinate (TPO-L), and/or phenylbis(2,4,6-trimethylbenzoyl)phosphine oxide (BAPO). In some embodiments of the present disclosure, the method may further include, prior to the functionalizing, deconstructing a plastic, where the deconstructing results in the forming of the deconstruction product. In some embodiments of the present disclosure, the plastic may include at least one of polyethylene terephthalate, glycol modified polyethylene terephthalate, polybutylene terephthalate, polytrimethylene terephthalate, polyethylene naphthalate, and/or polyethylene 2,5-furandicarboxylate.

BRIEF DESCRIPTION OF THE DRAWINGS

Some embodiments of the present disclosure are illustrated in the referenced figures of the drawings. It is intended that the embodiments and figures disclosed herein are to be considered illustrative rather than limiting.

DETAILED DESCRIPTION

Figure 1:
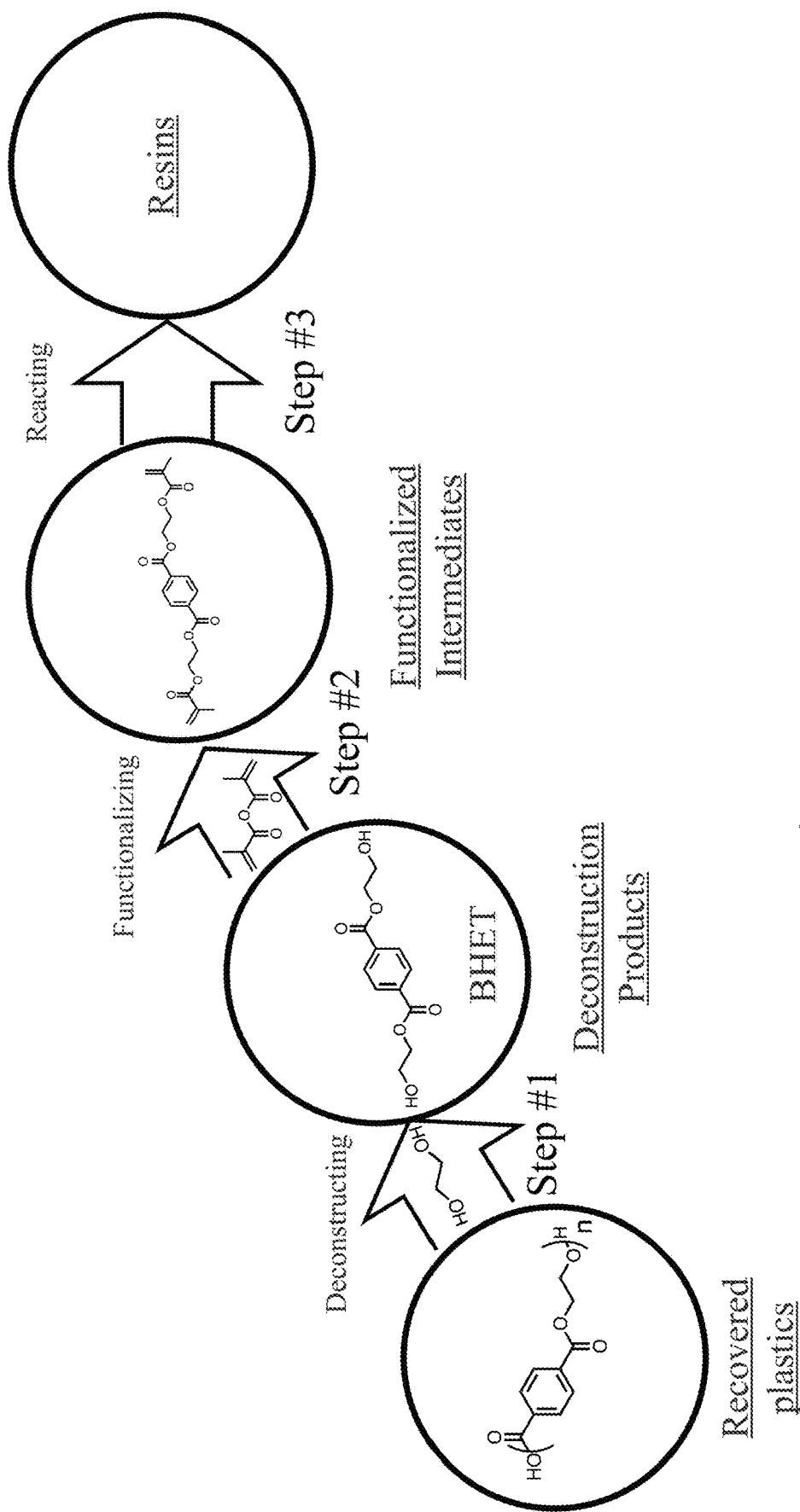
FIG. 1 illustrates an exemplary reaction for producing resins using functionalized intermediates having methacrylate end-groups, according to some embodiments of the present disclosure.

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Among other things, the present disclosure describes unique materials derived from recovered plastics and/or bioderived sources. For example, recovered products made of various polyesters may be deconstructed to smaller molecules (e.g., by glycolysis) followed by treating and/or reacting steps to produce useful intermediates capable of being reacted to manufacture useful polymers and/or resins. Examples of recovered plastics suitable for the methods described herein include polyethylene terephthalate (PET), glycol modified polyethylene terephthalate, polybutylene terephthalate, polytrimethylene terephthalate, polyethylene naphthalate, and/or polyethylene 2,5-furandicarboxylate.

Further, in some embodiments of the present disclosure, commodity polyesters may be converted to readily printable photopolymers. As shown herein, the final materials resulting from printable photopolymers possess comparable thermomechanical properties of comparable materials derived from petroleum on the market. As shown herein, by combining with biomass-derived monomers, some formulations may be optimized to provide an array of properties tailored to meet the requirements of the plastic's final use/application. Among other things, this work validates the concept of upcycling plastic waste through additive manufacturing to produce novel resins capable of competing with incumbent resins in a variety of final applications and products.

FIG. 1 illustrates a method for converting recovered plastics to resins, for example printable resins, where the method includes three processing steps, according to some embodiments of the present disclosure. Step #1, after waste plastics have been recovered, includes the deconstructing of the plastic waste to form one or more smaller molecules, referred to herein as "deconstruction products". The specifics of a deconstructing step may depend on the type of plastic being treated. For example, as shown in FIG. 1, a PET-containing recovered plastic may be deconstructed by a glycolysis reaction using a linear alkyl terminated on both ends with a hydroxyl group, resulting in the formation of deconstruction products (i.e., fragments) of the starting plastic that are also terminated with hydroxyl groups. Deconstruction products may also be generated by enzymatic hydrolysis, chemical hydrolysis, alcoholysis, methanolysis, and/or thermolysis.

Referring again to FIG. 1, the exemplary method may continue with Step #2, the functionalizing of the deconstruction products, resulting in the forming of materials having end-groups capable of reacting with other end-groups, to form higher molecular weight products, e.g, resins. For example, as shown in FIG. 1, methacrylate groups may be added by a methacrylation reaction of HO-terminated deconstruction products. The molecules providing the desired end-groups for functionalizing the deconstruction products are referred to herein as "functionalized reactants". The molecules resulting from Step #2, the functionalizing of the deconstruction products, are referred to herein as "functionalized intermediates". As shown in Scheme 5, a functionalized intermediate may have end-groups that include hydroxyl groups, epoxy groups, and or thiol groups. The exemplary method shown in FIG. 1 may then proceed with Step #3, the reacting of the monomers to form the final targeted resin having the desired physical properties and/or performance metrics. As described herein, the reacting may be achieved using a 3D printer where the functionalized intermediates are photoactivated resulting in the reaction of the end-groups, e.g., methacrylate groups, to produce the final resin. In some embodiments of the present disclosure, the reaction of functionalized intermediates to produce resins may by catalyzed using light and/or a heat-induced free radical initiator. In some embodiments, an intermediate step (not shown) may include a formulating step performed between Steps #2 and #3, where the functionalized intermediates may be combined with at least one of a reactant and/or additive to adjust one or more of the physical properties and/or performance metrics of the final targeted resin. In some embodiments of the present disclosure, such a formulating step may include the addition of at least one bioderived reactant and/or additive.

FIG. 1 illustrates both the general concept of using recovered plastics to generate resins and an exemplary set of reaction steps, according to some embodiments of the present disclosure. In the exemplary set of reaction steps, the degradation product bis(2-hydroxyethyl) terephthalate (BHET), is derived from the deconstructing (Step #1) of PET. The hydroxyl end-groups of the BHET deconstruction product are subsequently converted to methacrylate end-groups in the functionalizing step (Step #2), resulting in the formation of the functionalized intermediate, 1,4-bis [2-[(2-methyl-1-oxo-2-propen-1-yl)oxy]ethyl] ester (shortened herein to "Di-MB"). The functionalized intermediate, Di-MB, is then reacted to form the final target resin. These resins are colorless and may have viscosities in a range between about 500 cps and about 1500 cps at ambient temperature. Conveniently, they may be directly used on a desktop light-based 3D printer. As shown herein, BHET-derived resins may have mechanical properties that are comparable to resins manufactured from widely used biphenol A (BPA) derived materials. These include glass transition ($T_g$) temperatures between about 0° C. and about 250° C. and tensile moduli between about 0.5 GPa and about 3.0 GPa. Thus, among other things, upcycled PET-derived resins may provide drop-in replacement options to existing toxic BPA-derived materials, while providing materials that are readily deployable into the rapidly growing light-based 3D printing industry. Some examples of specific markets that may be targeted include automobile parts, personal wearables, prototyping, functional prototyping, models, toys, orthodontics, and other medical devices.

In some embodiments of the present disclosure, as described above, recovered PET may be deconstructed to yield a variety of hydroxyl group terminated deconstruction products, including BHET, which is shown below as Structure 1.

Structure 1

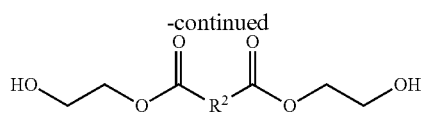

In some embodiments of the present disclosure, BHET may be derived by deconstructing a biomass-containing feedstock. However, BHET is just one example of a hydroxyl group terminated molecule that may be utilized to produce useful chemicals, polymers, and/or resins as described herein, by performing additional downstream processing as shown in FIG. 1. Examples of other hydroxyl group terminated deconstruction products that fall withing the scope of the present disclosure are summarized in Scheme 1 below.

Scheme 1

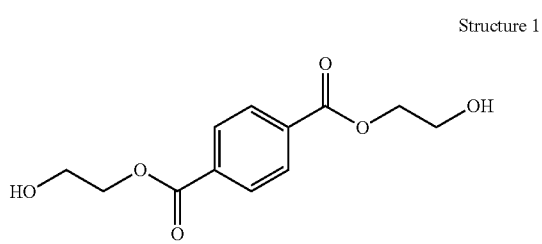 [SMILES: O=C(OCCO)c1ccc(C(=O)OCCO)cc1]

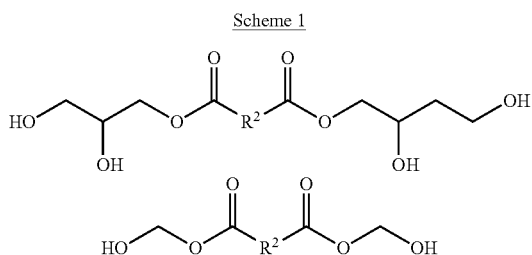

$R^2$ is a bridging group with some suitable examples shown in Scheme 2 below.

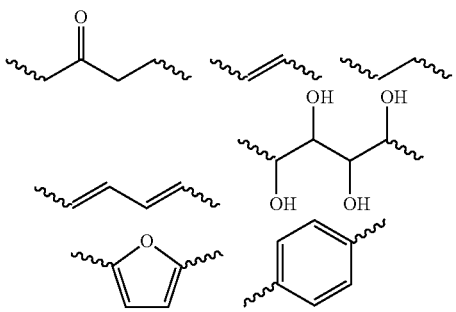

In Scheme 2, the symbol $\sim$ represents a covalent bond to a neighboring atom (not shown). As described herein, a hydroxyl group terminated starting material may be reacted to replace at least a portion of the hydroxyl groups with a vinyl group-containing end-group. For example, deconstruction product BHET may be reacted with a functionalized reactant, in this case methacrylic anhydride (MAAH), to produce at least one functionalized intermediate, 1-(2-hydroxyethyl) 4-[2-[(2-methyl-1-oxo-2-propen-1-yl)oxy] ethyl] ester (shortened to "Mono-MB"), and/or 1,4-bis [2-[(2-methyl-1-oxo-2-propen-1-yl)oxy]ethyl] ester (shortened to "Di-MB"), shown below as Structures 2 and 3, respectively.

Structure 2

Structure 3

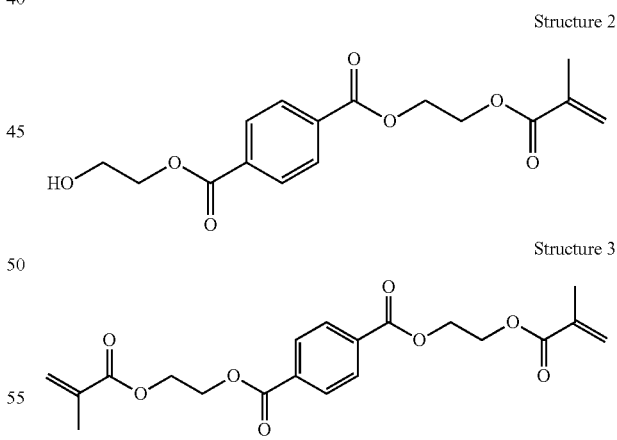

Thus, as described herein, a variety of molecules, derived from the deconstruction of plastics and/or bioderived may be utilized as starting materials to produce a variety of unique materials, e.g., polymers and resins, that provide replacements for existing materials. Functionalized intermediates Structures 2 and 3 above may be generalized as Structures 4 and 5 below, which, among other things describe the various combinations resulting from the deconstruction products summarized above in Schemes 1 and 2.

Structure 4

Structure 5

$R^1$ may include the functionalized intermediates summarized in Scheme 3, where examples of $R^2$ are shown in Scheme 2. Other possible reactive end-groups, R, positioned on functionalized intermediates include vinyl-containing reactive end-groups including methacrylate as summarized in Scheme 4 below. Such end-groups may result from reacting a variety of functionalized reactants, including methacrylic anhydride, methacrylic chloride, and/or methacrylic acid.

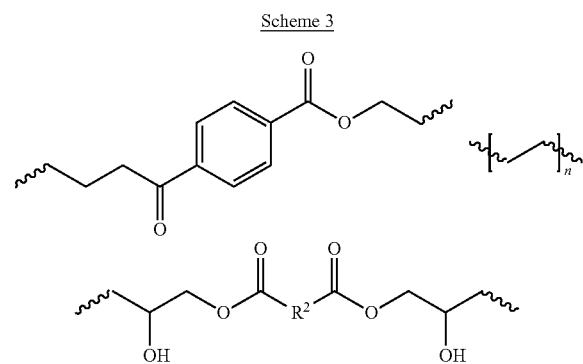

Scheme 3

Figure 2:
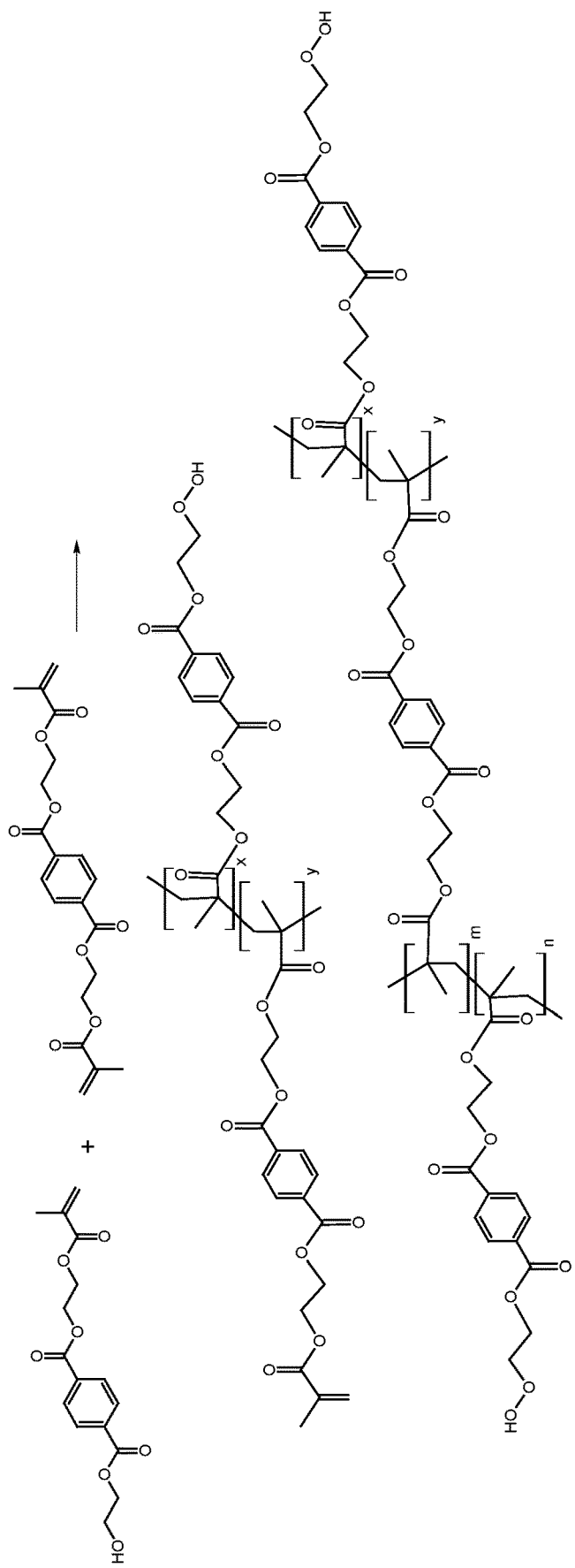
FIG. 2 illustrates reactions of functionalized intermediates to produce higher-molecular weight products (e.g., resins), according to some embodiments of the present disclosure.
Figure 3:
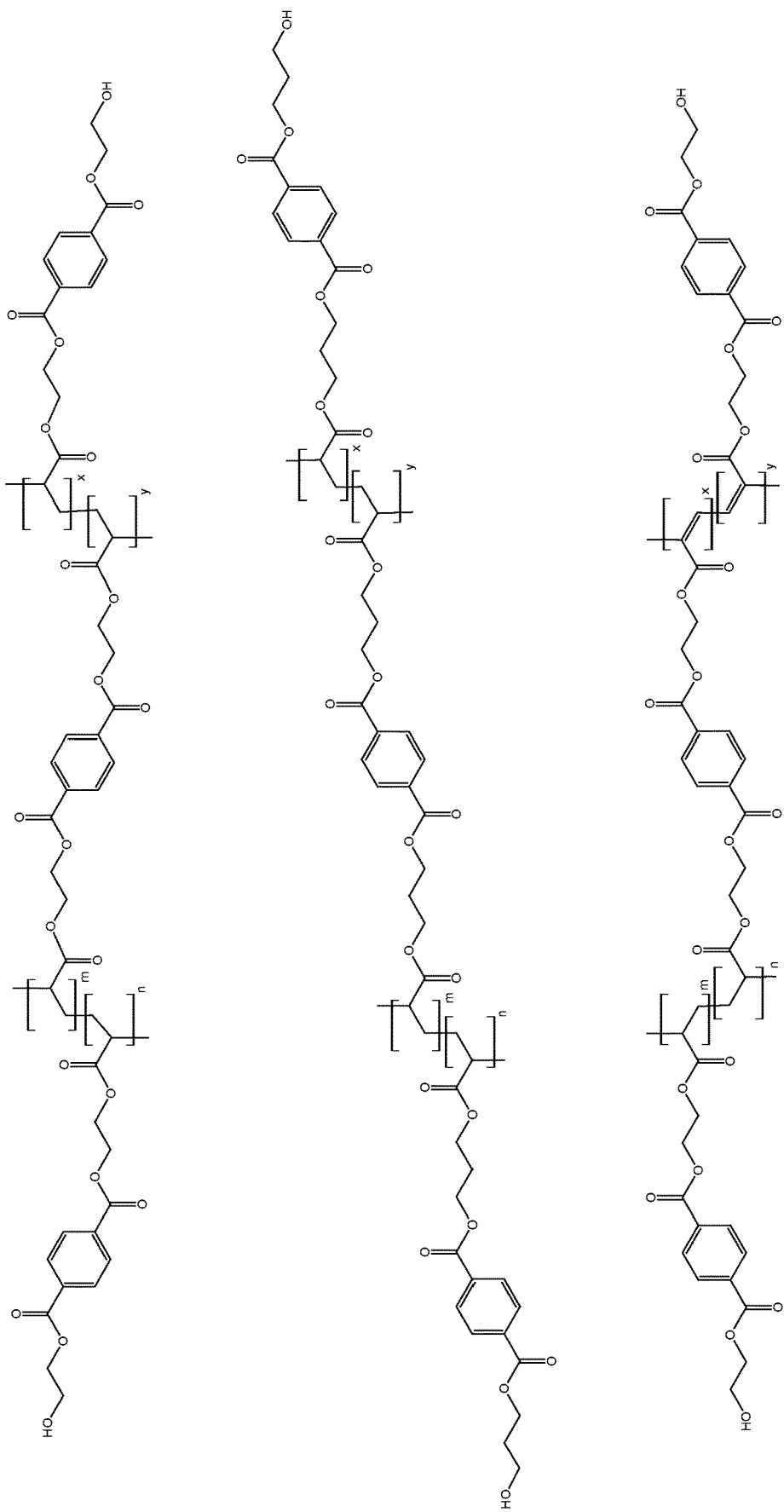
FIG. 3 illustrates exemplary bioderived resins and/or resins derived functionalized intermediates having acrylate end-groups, according to some embodiments of the present disclosure.

Referring to Scheme 3, in some embodiments of the present disclosure, u and n may each be between 1 and 10, inclusively. Generalized Structures 4 and Structure 5 may then be reacted (i.e., Step #3) to form various products, e.g., resins and polymers, where the example of reacting the functionalized intermediate methacrylated BHET is illustrated in FIG. 2. Additional exemplary products according to some embodiments of the present disclosure, for the case of reacting (i.e., Step #3 reacting) vinyl end-group functionalized BHET, according to the examples shown in Scheme 4 above, are illustrated in in FIG. 3.

As stated above, in some embodiments of the present disclosure, referring again to FIG. 1, a formulating step (not shown) may occur after functionalizing (Step #2) a deconstruction product to form a functionalized intermediate. Formulating may be performed to improve the physical properties of the final composition using in the reacting step (Step #3). For example, additives to adjust the viscosity of the mixture fed to the reacting step may be added.

Methacrylate reactions (Step #2 functionalizing) were carried out with various molar ratios of BHET and methacrylic anhydride, with the addition of 0.2 wt % of butylated hydroxytoluene (BHT) as a free-radical inhibitor and without the addition of a catalyst. The reactions were carried out for about 3 hours at a reaction temperature of about 140° C. Colorless liquid products were obtained, and subsequent purification was conducted by removing methacrylic acid (byproduct) under reduced pressure, for example between about 10 Torr and about 200 Torr and at a temperature between about 90° C. and about 120° C. Quantitative yields of the resultant functionalized intermediates are summarized in Table 1 below.

TABLE 1

Results from various degrees of methacrylation of BHET by methacrylic anhydride (MAAH) and physical properties of the resultant resins.

| Sample | Molar ratio (MAAH:BHET) | Degree of methacrylation | Viscosity (cps @25° C., if liquid) | Tg (° C.) (DMA)* | Modulus at 40° C. (GPa) | Rubbery Modulus (MPA) |
|---|---|---|---|---|---|---|
| 1 | 2.0 | 94 | Solid | 185 | 4.3 | 80 |
| 2 | 1.75 | 87 | solid suspension | 176 | ND* | ND |
| 3 | 1.5 | 79 | Liquid at 1000 cps | 166 | 3.7 | 45 |
| 4 | 1.25 | 63 | Viscous liquid | 121 | ND | ND |
| 5 | 1.0 | 50 | Waxy solid | 111 | 3.1 | 15 |

*DMA—dynamic mechanical analysis
*ND—not determined

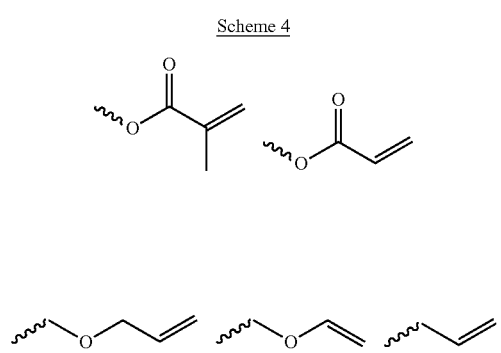

Scheme 4

The degree of methacrylation was determined by $^1$H NMR. As the ratio of BHET to methacrylic anhydride decreased, the degree of methacrylation also decreased. Notably, while all five samples of functionalized intermediates were initially liquid at ambient conditions, crystallization was noticed from Samples 1, 2, 4 and 5, and only Sample 3 stayed as room-temperature-stable liquid. The viscosity of Sample 3 was determined on a TA ARES rheometer equipped with parallel plates with 100 um gap. Importantly, the viscosity of 1000 cP is suitable for common stereolithographic (SLA) and digital light processing (DLP) 3D printers. Furthermore, the glass transition temperatures (Tg) were measured by casting the resins resulting from the reacting of these functionalized intermediates in PTFE molds and subsequently cured under 405 nm UV light for 60 min at 5 mW/cm². Dynamic mechanical analysis (DMA) was performed and the Tg was determined by the highest peak on tan δ curves. Referring to Table 1, Samples 1 and 5 were heated and melted to be fabricated into test specimens.

Figure 4:
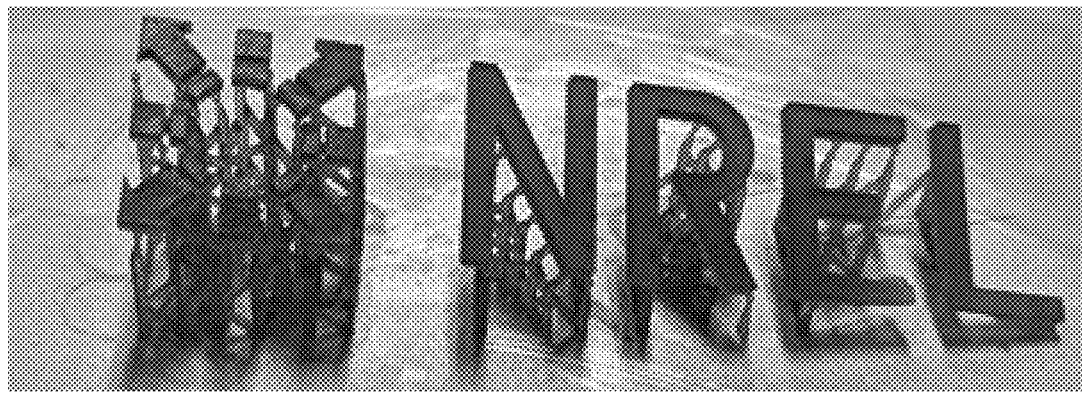
FIG. 4 illustrates an exemplary 3D printed part from using a methacrylated bis(2-hydroxyethyl) terephthalate resin, according to some embodiments of the present disclosure.

Sample 3 of Table 1 provided the optimum viscosity and a desirable Tg of 165° C. for the resultant resin, and, therefore, this functionalized intermediate was reacted in the 3D printer to produce the resultant resin. 1 wt % of a long wavelength UV photoinitiator, diphenyl(2,4,6-trimethylbenzoyl)phosphine oxide (TPO), was added to the functionalized intermediate to provide suitable photoreactivity and light absorbance. Blue pigment was also added to the functionalized intermediate for aesthetic purposes. The printing process was carried out on an open-source desktop 3D printer (Zortrax) in 100 um layer height. Exemplary 3D printed resin products are illustrated in FIG. 4. Table 3 illustrates the mechanical properties of the resultant resins compared to commercially available BPA-derived resins. Table 1 suggests that an MAAH:BHET ratio between about 1.25:1 and about 1.5:1 provides an optimum viscosity for downstream processing, e.g., in a 3D printer. Similarly, the corresponding degree of optimum methacrylation, which is proportional to the ratio of Mono-DB to Di-DB, appears to be between about 63% and about 79%.

TABLE 3

Mechanical properties of methacrylated BHET resin and a commercially available BPA derived resin.

| Materials | Tensile Strength (MPa) | Modulus (GPa) | Elongation at Break |
|---|---|---|---|
| Methacrylated BHET (Sample 3) | 93 | 1.9 | 6% |
| 4-EO BPA dimethacrylate | 72 | 1.5 | 7% |

Bisphenol A (BPA) derived resin has been widely used in today's SLA 3D materials. An ethoxylated BPA (EO/phenol=4) dimethacrylate from Miwon Specialty Chemical Co., Ltd. was chosen as a comparison to the BHET-derived resins described above. ASTM type V tensile bars (i.e., dogbones) were successfully printed under the same fabrication and post-printing processing conditions and were tested on an Instron tensile tester. Notably, the methacrylated BHET exhibited higher tensile strength and Young's modulus than those of the BPA resin, while the elongations of break were similar. Though preliminary, it is shown that the material properties of the BHET derived resin can match and possibly outperform the BPA resin.

Figure 5:
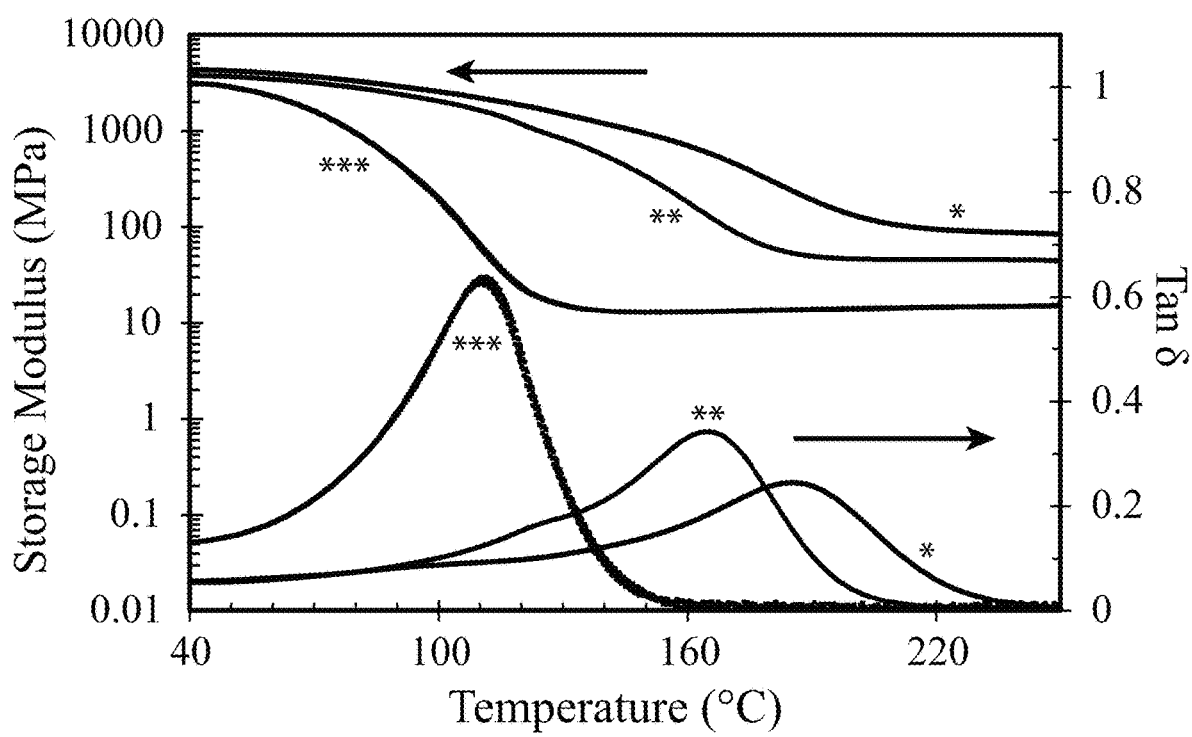
FIG. 5 illustrates a plot of storage moduli and tan δ curves for determining Tg of resins produced by methods described herein, according to some embodiments of the present disclosure.
Figure 6:
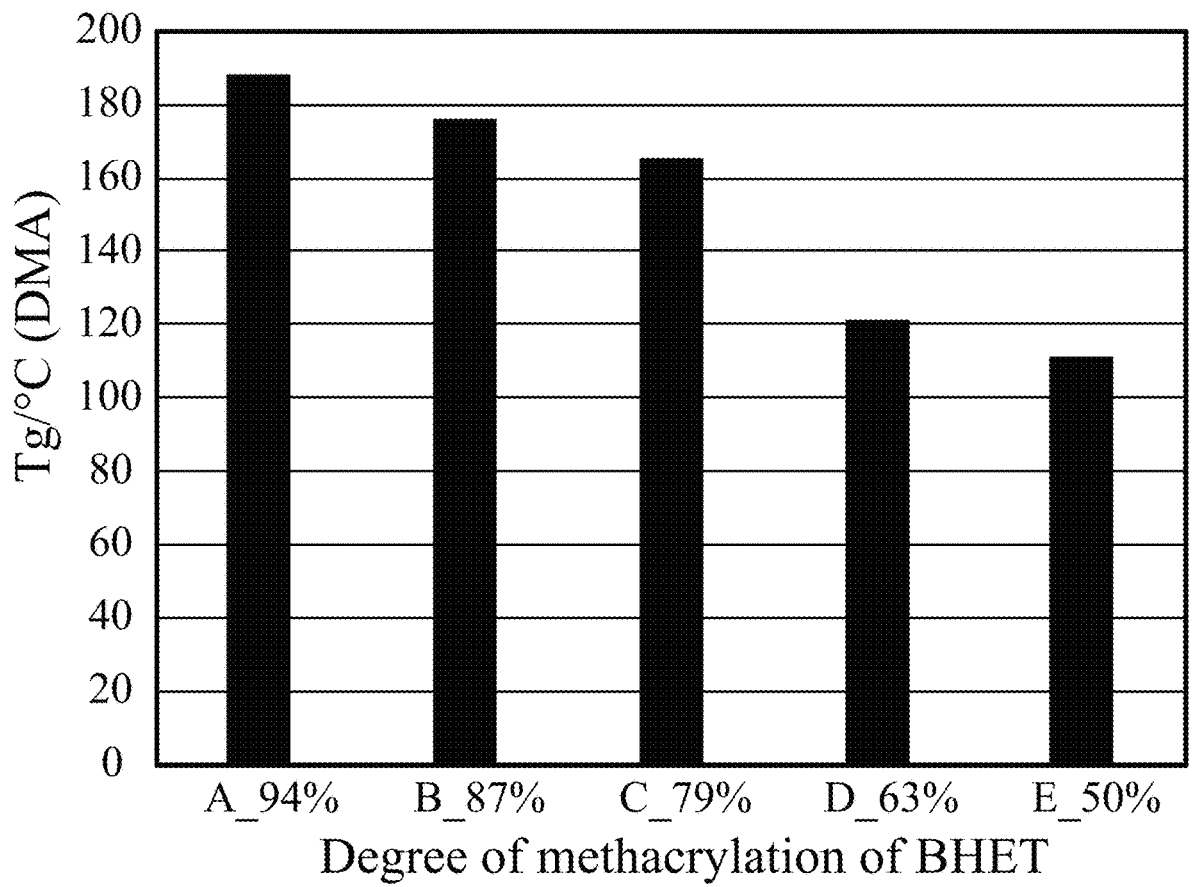
FIG. 6 illustrates Tg of resins versus degree of methacrylation of bis(2-hydroxyethyl) terephthalate (BHET), according to some embodiments of the present disclosure.

FIG. 5 illustrates a plot of storage moduli and tan δ curves for determining Tg for Samples 1, 3, and 5 of Table 1 (*=Sample 1, =Sample 3, and *=Sample 5). Notably, Sample 3 demonstrated a Tg of about 166° C., which is very similar to that of ethoxylated BPA dimethacrylate. FIG. 6 illustrates Tg versus degree of methacrylation of the BHET, which shows that a degree of methacrylation of about 79% is preferable, as the resultant functionalized intermediate remains a liquid having a viscosity suitable for processing of the reacting step, was scalable to a 70 g per batch bench scale, and produced a final resin having a desirable Tg.

Although the examples provided herein focus on methacrylate-functionalized intermediates for producing resins, other examples functionalized intermediates include vinyl groups, epoxy groups, and sulfur functional groups. Specific examples of functionalized intermediates include diallyl terephthalate, bis(allyloxyethyl)terephthalate, bis(mercaptoethyl)terephthalate, bis(mercaptopriopionicethyl)terephthalate, bis-glycidyl terephthalate, and bis(glycidylethyl)terephthalate, which are shown in Scheme 5 below, respectively. These molecules may be produced by reacting BHET with allyl alcohol, 2-allyloxyethanol, mercaptoethanol, mercaptopropionic acid, epichlorohydrin, and excess amount of epichlorohydrin, respectively.

Scheme 5

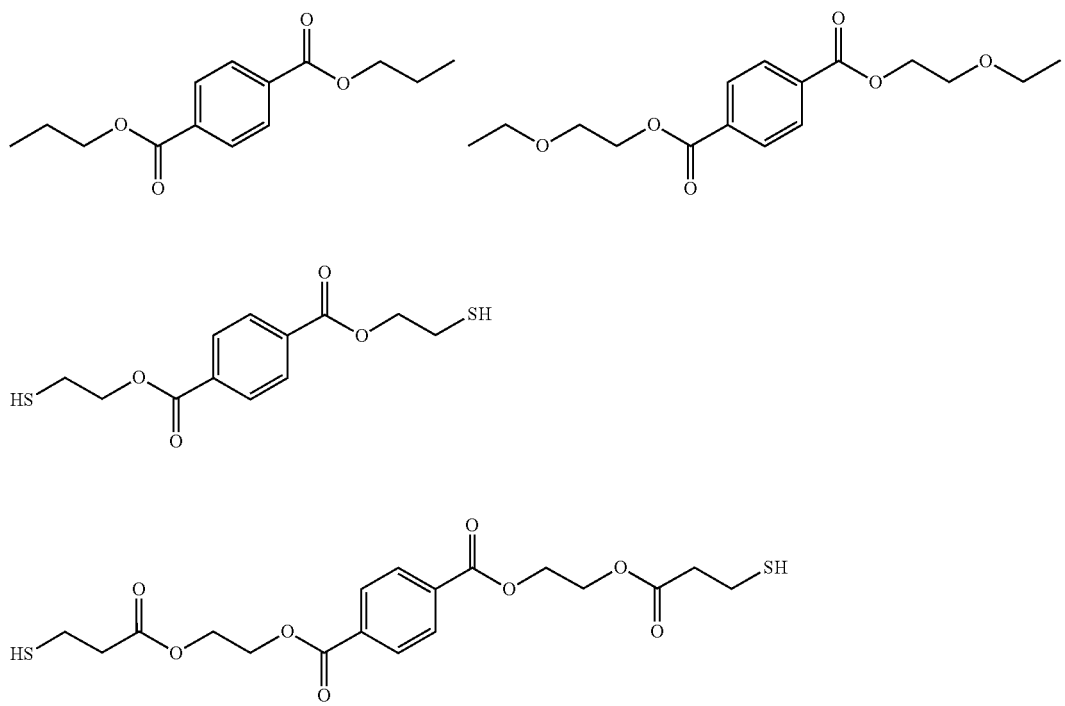

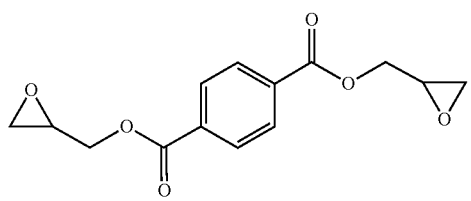
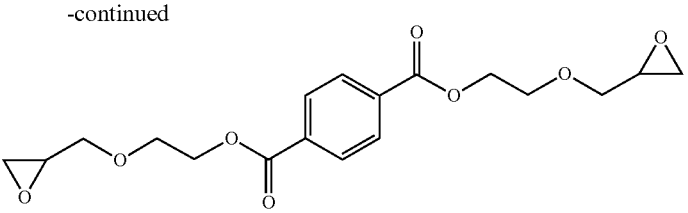

In some embodiments of the present disclosure, bio-derived carboxylic acids, either as deconstruction products and/or derived by other means, may be reacted to form functionalized intermediates. A generalized reaction is shown in Reaction 1 below, reacting a dicarboxylic acid with glycidyl methacrylate.

Reaction 1

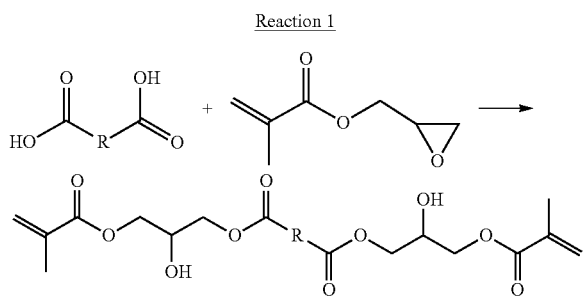

Reaction 1 was performed using two exemplary bio-derived dicarboxylic acids, adipic acid and itaconic acid. However, other dicarboxylic acids may also be used with examples including muconic acid, oxalic acid, malonic acid, maleic acid, succinic acid, glutaric acid, pimelic acid, suberic acid, azelaic acid, and/or sebacic acid. In some embodiments, referring to Reaction 1, a bioderived dicarboxylic acid may include the carboxylic acid functional groups separated by R, where R may be a carbon chain having between 1 and 20 carbon atoms. The carbon chain may be branched or linear and saturated or unsaturated. In some embodiments of the present disclosure, R may include other elements such as hydrogen, nitrogen, oxygen, sulfur, and/or phosphorus.

Adipic acid and itaconic acid were reacted with glycidyl methacrylate at a reaction temperature of about 140° C. for about three hours (using triphenylphosphine at 0.5 wt % as a catalyst). The structures resulting from Reaction 1 for adipic acid and itaconic acid are shown below in Scheme 6, respectively. When reacted (i.e., Step 3), resins were obtained having a Tg/° C. (DMA) of about 140° C. and greater than 250° C., respectively (">250 indicates that the material maintained stiffness and did not become soft at temperatures of about 250° C. and below). Also, approximate viscosities of the final functionalized intermediates resulting from reacting adipic acid and itaconic acid where about 8,000 cps and about 20,000 cps, respectively.

Scheme 6

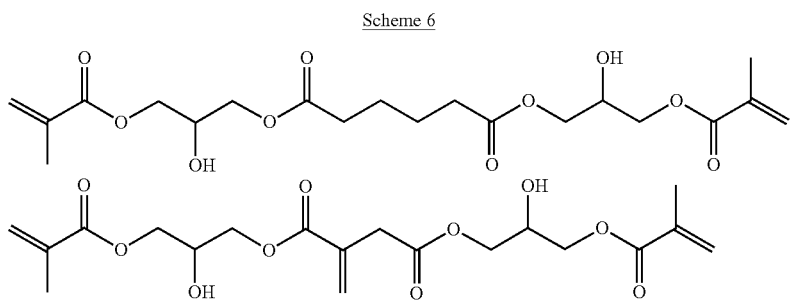

Figure 7:
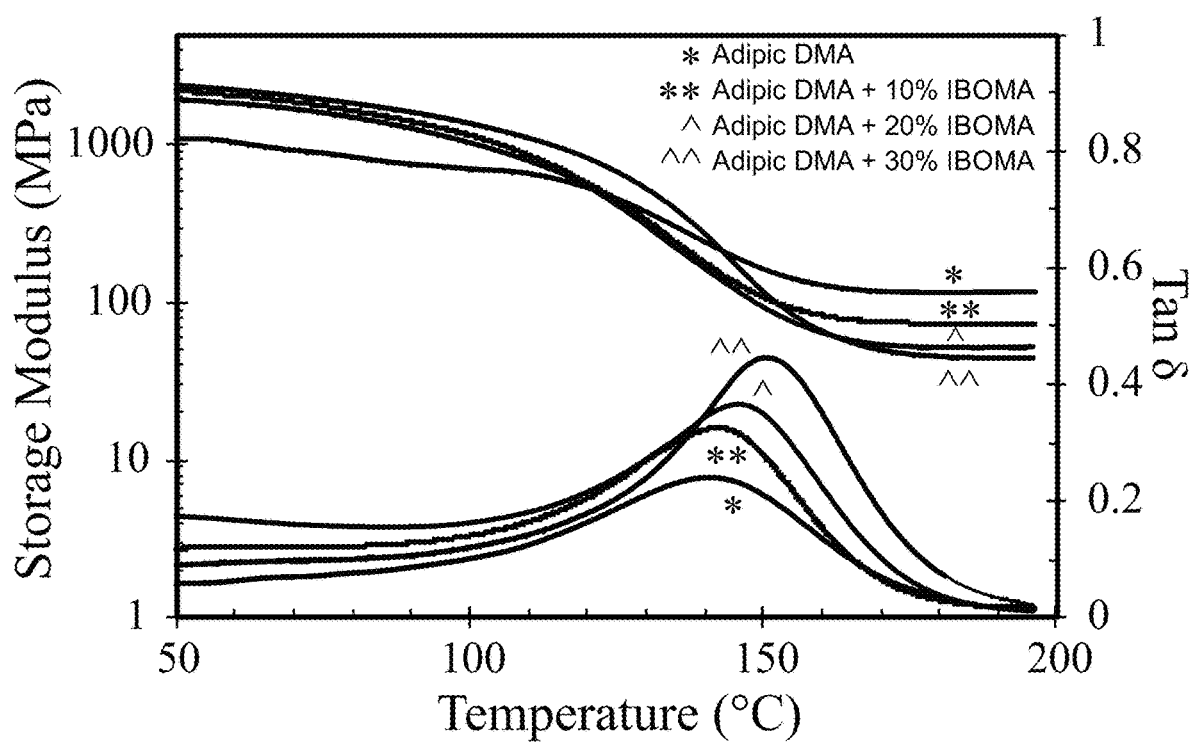
FIG. 7 illustrates the storage modulus and tan δ for determining Tg of resins obtained via methods described herein, according to some embodiments of the present disclosure.
Figure 8:
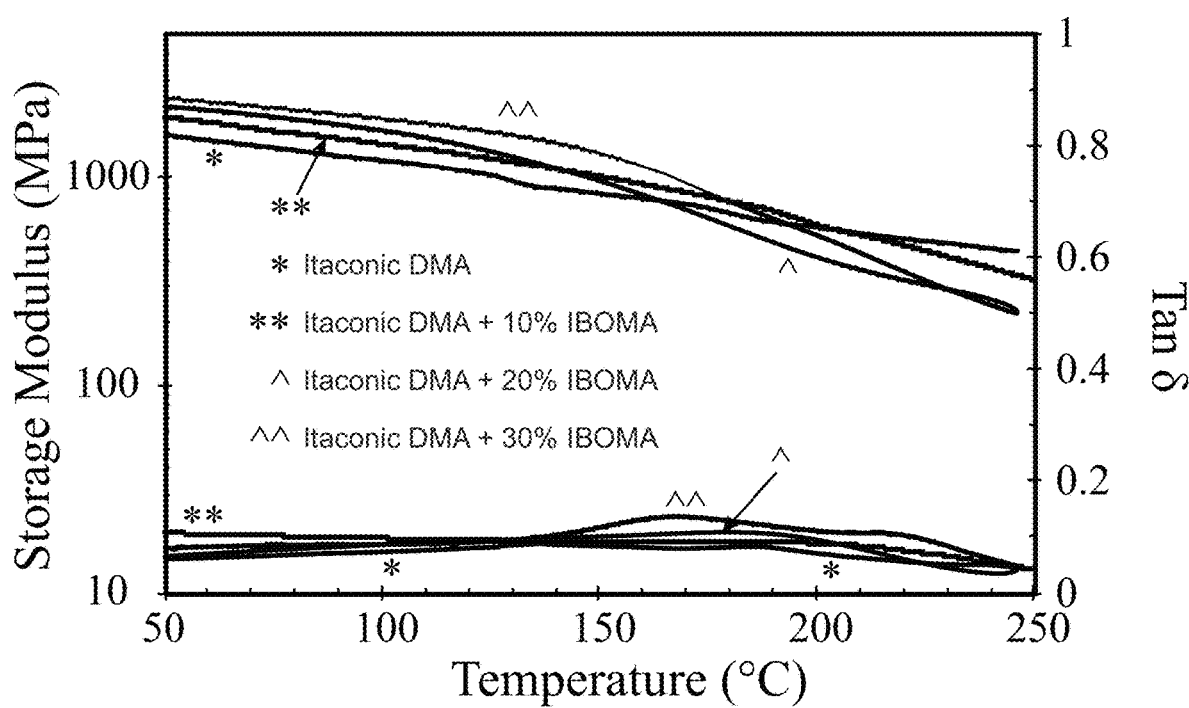
FIG. 8 illustrates the storage modulus and tan δ for determining Tg of resins obtained via methods described herein, according to some embodiments of the present disclosure.

FIG. 7 illustrates experimental results, storage modulus and tan δ for determining Tg of resins resulting from the reacting (Step #3) of the functionalized intermediate resulting from the reaction of adipic acid (first structure in Scheme 6) as shown in Reaction 1 and isobornyl methacrylate (IBOMA). The IBOMA adjusted the viscosity of the reacting mixture to be suitable for printing, while still maintaining good final properties; e.g., Tg ranges between about 25° C. and about 250° C. and storage moduli between about 100 MPa and about 5 GPa. FIG. 8 illustrates experimental results, storage modulus and tan δ for determining Tg of resins resulting from the reacting (Step #3) of the functionalized intermediate resulting from the reaction of itaconic acid (second structure in Scheme 6) as shown in Reaction 1 and isobornyl methacrylate (IBOMA).

Figure 9:
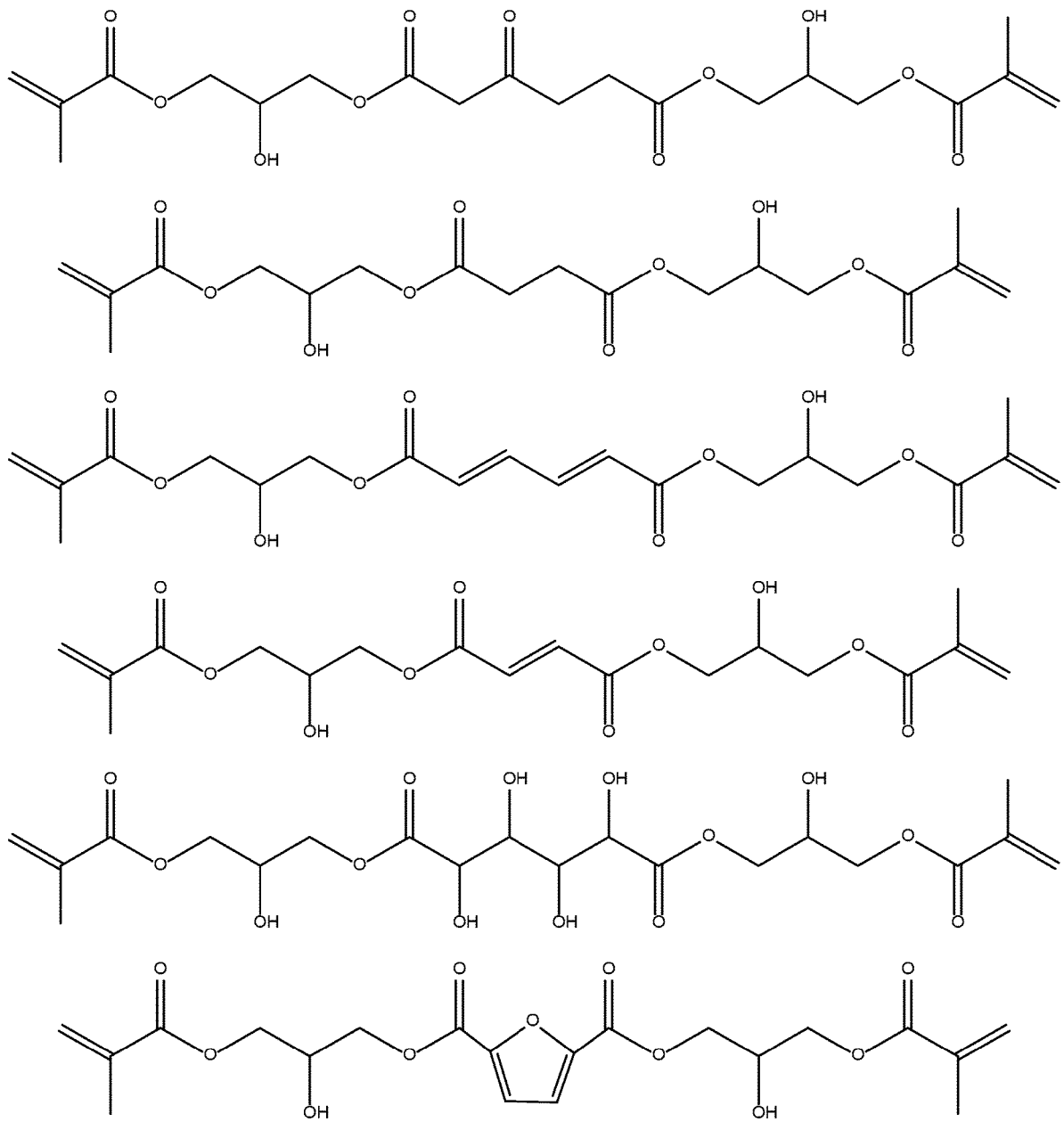
FIG. 9 illustrates examples of functionalized intermediates capable of being reacted to form resins, according to some embodiments of the present disclosure.

Other methacrylate-functionalized intermediates may be obtained from a variety of bioderived acids. Examples of such bioderived acids include β-keto adipic acid, succinic acid, muconic acid, fumaric acid, saccharic acid, and furan dicarboxylic acid. These structures are summarized in FIG. 9. Structure 6 illustrates a generalized structure that represents each of the structures shown in FIG. 9.

Structure 6

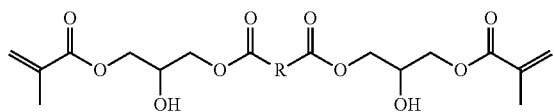

Scheme 7 summarizes some embodiments of R, as derived from β-keto adipic acid, succinic acid, muconic acid, fumaric acid, saccharic acid, and furan dicarboxylic acid, respectively.

Scheme 7

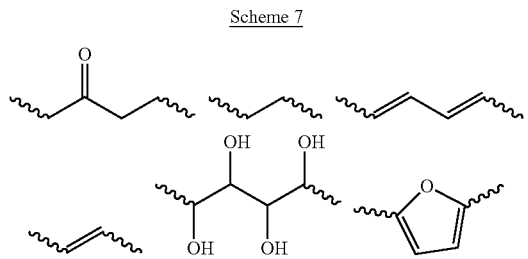

Whether or not a reactant or product described herein is "bioderived" may be determined by analytical methods. Using radiocarbon and isotope ratio mass spectrometry analysis, the bio-based content of materials can be determined. ASTM International, formally known as the American Society for Testing and Materials, has established a standard method for assessing the biobased content of carbon-containing materials. The ASTM method is designated ASTM-D6866. The application of ASTM-D6866 to derive a "biobased content" is built on the same concepts as radiocarbon dating, but without use of the age equations. The analysis is performed by deriving a ratio of the amount of radiocarbon (14C) in an unknown sample to that of a modern reference standard. The ratio is reported as a percentage with the units "pMC" (percent modern carbon). If the material being analyzed is a mixture of present-day radiocarbon and fossil carbon (containing no radiocarbon), then the pMC value obtained correlates directly to the amount of biomass material present in the sample. Thus, ASTM-D866 may be used to validate that the compositions described herein are and/or are not derived from renewable sources.

EXAMPLES

Example 1. A method comprising: reacting a first functionalized intermediate with a second functionalized intermediate to form a resin, wherein: the first functionalized intermediate comprises

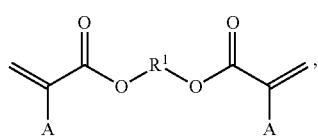

the second functionalized intermediate comprises

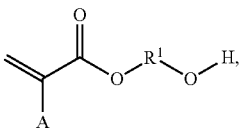

the resin comprises a first repeat unit as defined by Structure (I),

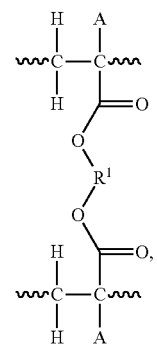

(I)

A is selected from the group consisting of a methyl group or a hydrogen atom, $R^1$ comprises a first bridging group, and ⸺ is a covalent bond.

Example 2. The method of Example 1, wherein: the resin further comprises a second repeat unit as defined by Structure (II),

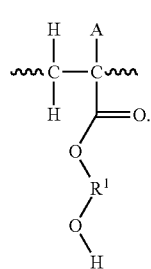

(II)

Example 3. The method of either Examples 1 or 2, wherein: $R^1$ comprises at least one of

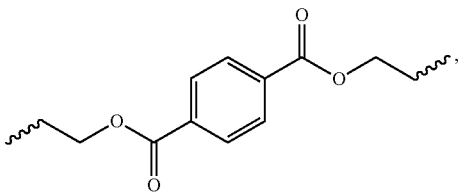

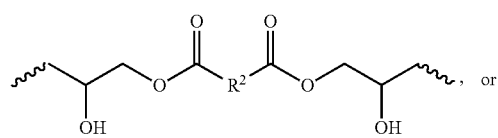

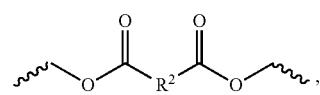

and R² comprises a second bridging group.

Example 4. The method of any one of Examples 2-3, wherein: R² comprises at least one of

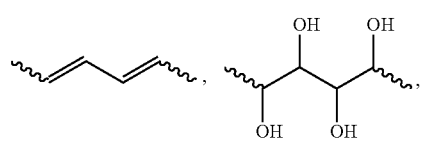

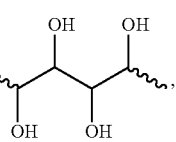

Example 5. The method of any one of Examples 1-4, wherein: R¹ comprises

and the resin comprises

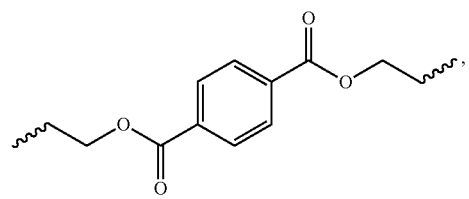

Example 6. The method of any one of Examples 1-5, further comprising: prior to the reacting, in a first mixture comprising a deconstruction product and a functionalized reactant, functionalizing the deconstruction product, wherein: the deconstruction product comprises

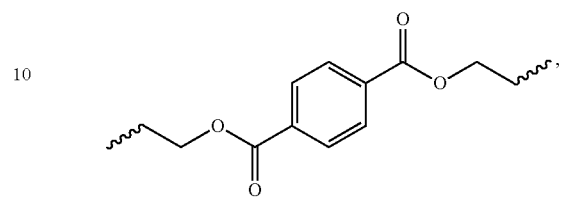

the functionalized intermediate comprises at least one of

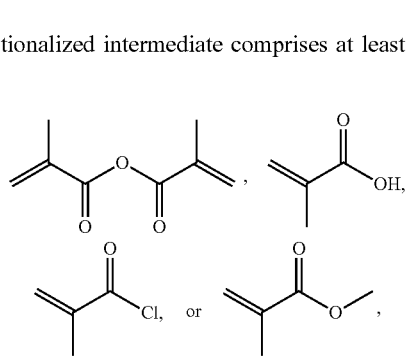

and the functionalizing produces the first functionalized intermediate comprising

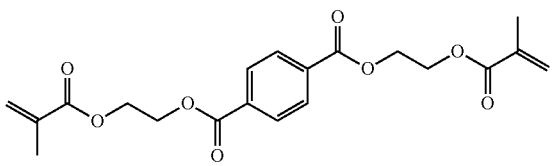 [SMILES: C=C(C)C(=O)OCCOC(=O)c1ccc(C(=O)OCCOC(=O)C(=C)C)cc1]

and the second functionalized intermediate comprising

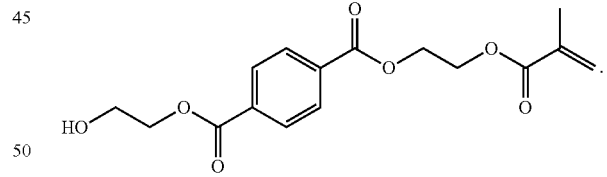

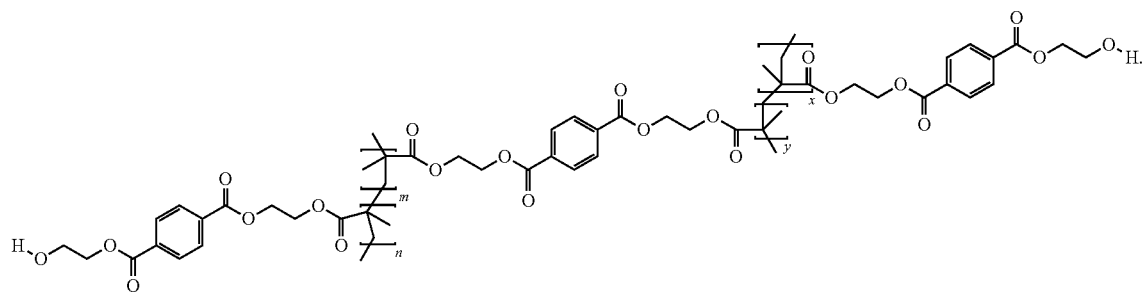

Example 7. The method of any one of Examples 1-6, wherein: the first functionalized intermediate and the second functionalized intermediate are reacted at a molar ratio of the first functionalized intermediate to the second functionalized intermediate between about 1:2 and about 1:1 or between about 1:0.5 to about 1:1.

Example 8. The method of any one of Examples 1-7, wherein the first functionalized intermediate and the second functionalized intermediate form a second mixture having a viscosity between about 800 cP and 1200 cP at 25° C.

Example 9. The method of any one of Examples 1-8, wherein the reacting is performed at a temperature between 20° C. and 150° C. or between 20° C. and 50° C.

Example 10. The method of any one of Examples 1-9, wherein the reacting is photoinitiated at a wavelength between 254 nm and 500 nm.

Example 11. The method of any one of Examples 1-10, wherein the reacting is photoinitiated using at least one of diphenyl(2,4,6-trimethylbenzoyl)phosphine oxide (TPO), ethyl (2,4,6-trimethylbenzoyl) phenylphosphinate (TPO-L), or phenylbis(2,4,6-trimethylbenzoyl)phosphine oxide (BAPO).

Example 12. The method of any one of Examples 1-11, wherein the product has a tensile strength between about 20 MPa and about 100 MPa.

Example 13. The method of any one of Examples 1-12, wherein the product has a modulus between about 0.5 GPa and about 3.0 GPa.

Example 14. The method of any one of Examples 1-13, wherein the product has an elongation at break between about 0.1% and about 100%.

Example 15. The method of any one of Examples 1-14, wherein the product has a glass transition temperature between about 0° C. and about 250° C.

Example 16. The method of any one of Examples 1-15, wherein the product comprises at least one of a polymer or a resin.

Example 17. The method of any one of Examples 1-16, further comprising: prior to the functionalizing, deconstructing a plastic, wherein: the deconstructing results in the forming of the deconstruction product.

Example 18. The method of any one of Examples 1-17, wherein the plastic comprises at least one of polyethylene terephthalate, glycol modified polyethylene terephthalate, polybutylene terephthalate, polytrimethylene terephthalate, polyethylene naphthalate, or polyethylene 2,5-furandicarboxylate.

Example 19. The method of any one of Examples 1-18, wherein the deconstructing is performed by glycolysis.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

The invention claimed is:

1. A resin comprising:
a first repeat unit as defined by Structure (I),

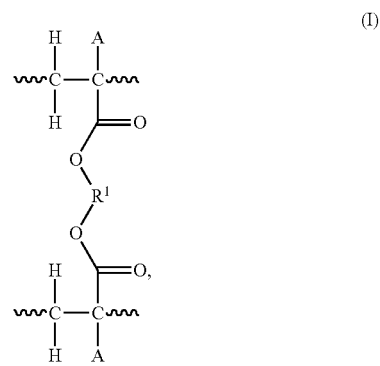

wherein:
A is selected from the group consisting of a methyl group and a hydrogen atom,
$R^1$ comprises a first bridging group,
and ⸺ is a covalent bond.

2. The resin of claim 1, wherein:
$R^1$ comprises at least one of

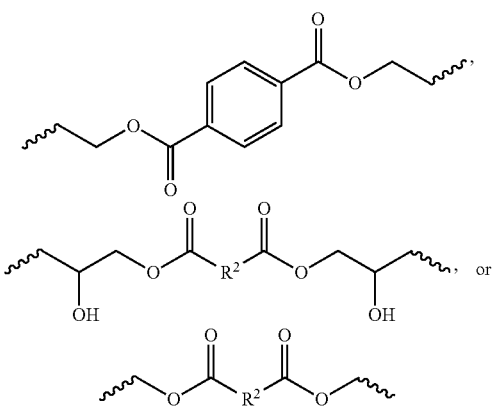

and
$R^2$ comprises a second bridging group.

3. The resin of claim 2, wherein:
$R^2$ comprises at least one of

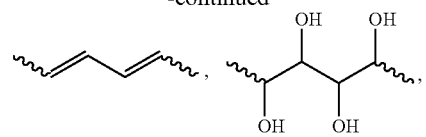

4. The resin of claim 2, wherein:
R¹ is

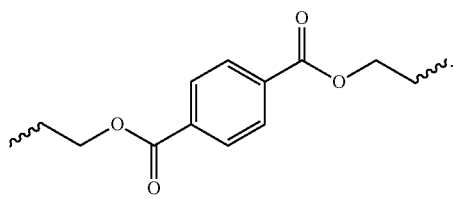

5. The resin of claim 1, further comprising a second repeat unit as defined by Structure (II), (II)

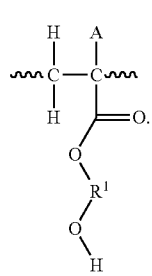

6. The resin of claim 1, comprising a tensile strength between about 20 MPa and about 100 MPa.

7. The resin of claim 1, comprising a modulus between about 0.5 GPa and about 3.0 GPa.

8. The resin of claim 1, comprising an elongation at break between about 0.1% and about 100%.

9. The resin of claim 1, comprising a glass transition temperature between about 0° C. and about 250° C.

10. A method comprising:
reacting a first functionalized intermediate with a second functionalized intermediate to form a resin, wherein:
the first functionalized intermediate comprises

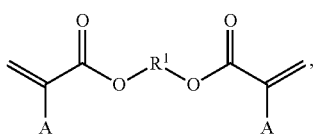

the second functionalized intermediate comprises

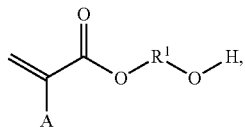

the resin comprises a first repeat unit as defined by Structure (I), (I)

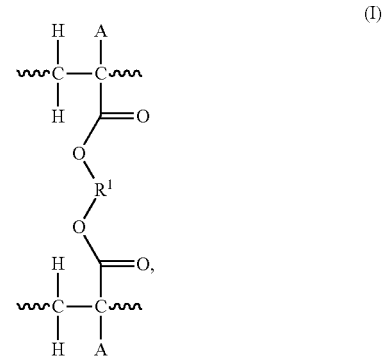

the resin further comprises a second repeat unit as defined by Structure (II), (II)

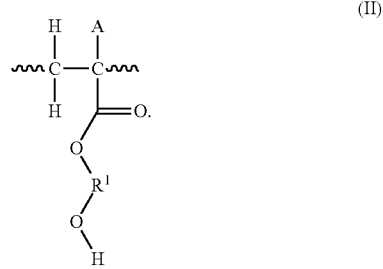

A is selected from the group consisting of a methyl group and a hydrogen atom,
R¹ comprises a first bridging group,

 is a covalent bond.

11. The method of claim 10, further comprising:
prior to the reacting, in a first mixture comprising a deconstruction product and a reactant comprising an acrylate group or a methacrylate group, functionalizing the deconstruction product, wherein:
the deconstruction product comprises

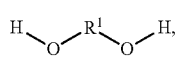

and
the functionalizing produces the first functionalized intermediate and the second functionalized intermediate.

12. The method of claim 10, wherein:
the reacting is performed using a second mixture of the first functionalized intermediate and the second functionalized intermediate, and the first functionalized intermediate and the second functionalized intermediate are at a molar ratio between about 1:2 and about 1:1.

13. The method of claim 12, wherein the second mixture has a viscosity between about 800 cP and 1200 cP at when measured at a temperature of about 25° C.

14. The method of claim 10, wherein the reacting is performed at a temperature between 20° C. and 150° C.

15. The method of claim 10, wherein the reacting is photoinitiated at a wavelength between 254 nm and 500 nm.

16. The method of claim 10, wherein the reacting is photoinitiated using at least one of diphenyl(2,4,6-trimethylbenzoyl)phosphine oxide (TPO), ethyl (2,4,6-trimethylbenzoyl) phenylphosphinate (TPO-L), or phenylbis(2,4,6-trimethylbenzoyl)phosphine oxide (BAPO).

17. The method of claim 11, further comprising:
prior to the functionalizing, deconstructing a plastic, wherein:
the deconstructing results in the forming of the deconstruction product.

18. The method of claim 17, wherein the plastic comprises at least one of polyethylene terephthalate, glycol modified polyethylene terephthalate, polybutylene terephthalate, polytrimethylene terephthalate, polyethylene naphthalate, or polyethylene 2,5-furandicarboxylate.

* * * * *